(12) United States Patent  
Nakamura et al.

(10) Patent No.: US 8,419,823 B2  
(45) Date of Patent: Apr. 16, 2013

(54) METHOD FOR RECOVERING METAL

(75) Inventors: Koichiro Nakamura, Tokyo (JP); Akihiro Hishinuma, Tokyo (JP); Shinji Kamiya, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 705 days.

(21) Appl. No.: 12/596,539

(22) PCT Filed: Apr. 18, 2008

(86) PCT No.: PCT/JP2008/001036  
§ 371 (c)(1),  
(2), (4) Date: Nov. 6, 2009

(87) PCT Pub. No.: WO2008/132830  
PCT Pub. Date: Nov. 6, 2008

(65) Prior Publication Data  
US 2010/0116090 A1 May 13, 2010

(30) Foreign Application Priority Data

Apr. 19, 2007 (JP) ................................. 2007-110027

(51) Int. Cl.  
*C22B 21/00* (2006.01)  
*C22B 58/00* (2006.01)  
*C25C 1/00* (2006.01)  
*B01D 15/00* (2006.01)

(52) U.S. Cl.  
USPC ............. 75/392; 205/560; 205/563; 205/564; 210/668; 210/683; 588/313; 588/319; 588/410; 588/412

(58) Field of Classification Search .................... 75/392; 205/564, 563, 560; 210/668, 683, 688; 588/313, 588/319, 410, 412  
See application file for complete search history.

(56) References Cited

U.S. PATENT DOCUMENTS

2007/0131609 A1* 6/2007 Ramaswamy et al. ........ 210/490

FOREIGN PATENT DOCUMENTS

| JP | 08-196804 | 8/1996 |
| JP | 08-196805 | 8/1996 |
| JP | 2002-256355 | 9/2002 |
| JP | 2003-164863 | 6/2003 |
| JP | 2007-300802 | 11/2007 |

OTHER PUBLICATIONS

Machine translation of JP 2003-164863, published Jun. 10, 2003.*  
Zhang et al. "Arsenic(V) Removal with a Ce(IV)-Doped Iron Oxide Adsorbent." Chemosphere 51 (2003) pp. 945-952.*

* cited by examiner

*Primary Examiner* — George Wyszomierski  
*Assistant Examiner* — Tima M McGuthry Banks  
(74) *Attorney, Agent, or Firm* — Hamre, Schumann, Mueller & Larson, P.C.

(57) ABSTRACT

The present disclosure describes a method for recovering metals such as gallium, indium and aluminum from III-V group compound semiconductors or semiconducting materials thereof containing arsenic, antimony and/or selenium. The method includes the step of adsorbing the arsenic, antimony and selenium selectively to an adsorbent containing the rare-earth metal compound with the use of the adsorbent.

5 Claims, 2 Drawing Sheets

METHOD FOR RECOVERING METAL

This application is a 371 national stage of PCT/JP2008/001036, filed Apr. 18, 2008.

TECHNICAL FIELD

The present invention relates to a method for recovering metal(s), in particular, a method for recovering metal(s) capable of recovering metal(s) with a harmful material being removed by using an adsorbent comprising a rare-earth metal compound.

BACKGROUND ART

In the past, as a method for recovering rare metals such as gallium, indium etc., from GaAs, GaAlAs, InGaAs etc., which are III-V group compound semiconductors, for example, an oxidation combustion method, a vacuum thermal recycling method are known.

An oxidation combustion method is for separating solid-state gallium oxide and gasiform arsine oxide by the following reaction:

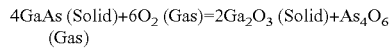

As a vacuum thermal recycling method, for example, as a method for recovering gallium and indium that gallium and indium are recovered at low cost from a compound semiconductor crystal scrap which gallium, indium and arsenic are a main component as mentioned in the Patent literature 1, a method for recovering gallium and indium after the semiconductor crystal scrap is heated under reduced pressure and then arsenic being sublimed, is known.

Further, the separation and refinement process using an ion-exchange resin can be carried out in the case that gallium and indium etc. are recovered from powdery waste metal, grinding waste liquid, and sludge which are generated in the manufacture or process of the III-V group compound semiconductors.

Patent literature 1: JP-A-2002-256355

DISCLOSURE OF THE INVENTION

Problems to be Resolved by the Invention

However, in the above oxidation combustion method, there is still problem that a composite oxide made of gallium and arsenic might be generated. This is because the following reaction will proceed in the case of high partial pressure of oxygen:

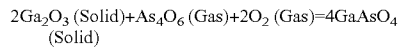

Moreover, in the method described in the above patent literature 1, there is still problem that it is not desirable from a safety standpoint because there are no descriptions concerning the treatment of the sublimed arsenic.

In the separation and refinement process using an ion-exchange resin for recovering gallium and indium etc., from powdery waste metal, grinding waste liquid, or sludge which are generated in the manufacture or process of the III-V group compound semiconductors, a powdery arsenic and a trivalent arsenic compound are highly toxic, and therefore, it is necessary to handle them with care. In particular, the inorganic arsenic is a toxic substance, and a cancer-causing agent.

In addition, in the past, there are no treatment of the harmful compound generated when these metals are recovered. Therefore, a method for recovering metals in consideration of the treatment of the generated harmful compound is desired, in order to carry out a recovery or a recycle in safety.

It is an object of the present invention to make it possible to recover and recycle the rare metals such as gallium and indium safely from the III-V group compound semiconductors, in order to resolve the above problems in the prior art.

Means of Solving the Problems

Therefore, in order to accomplish the above objects, the present inventors made strenuous studies on an effect of the adsorbent to the metal composition. As a result, the inventors discovered the method for recovering the metals according to the present invention.

That is, a method for recovering the metals according to the present invention is characterized by recovering at least one metal selected from the group comprising gallium, indium and aluminum from the III-V group compound semiconductors or the semiconducting materials of them containing at least one element selected from the group comprising arsenic, antimony and selenium, and comprising the step of adsorbing the arsenic, antimony and selenium selectively to an adsorbent containing the rare-earth metal compound with the use of the adsorbent.

Effect of Invention

The present invention has an advantageous effect that it is possible to safely recover and recycle the metals such as indium, gallium by separating a harmful arsenic, antimony and selenium from the III-V group compound semiconductors or the semiconducting materials of them containing at least one element selected from the group comprising arsenic, antimony and selenium.

Further, the present invention has an advantageous effect that it is possible to detoxify arsenic etc., since the present invention also makes it possible to recover the harmful substances such as the separated arsenic easily.

BRIEF DESCRIPTION OF THE DRAWINGS

For a better understanding of the invention, reference is made to the attached drawings, wherein.

BEST MODE FOR CARRYING OUT THE INVENTION

Figure 1:
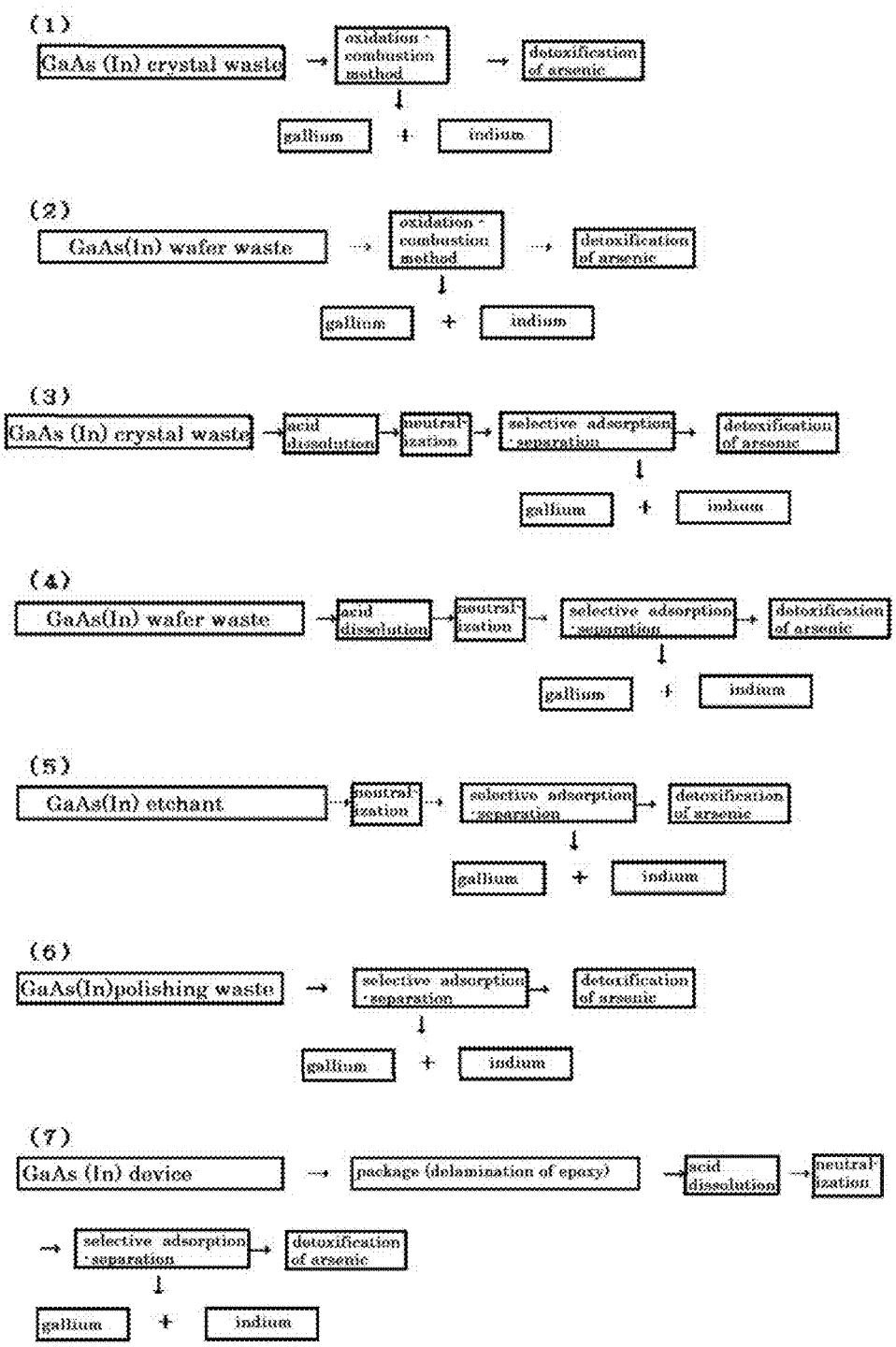
FIG. 1 shows a scheme concerning the detoxification process of arsenic existing in the semiconductor or the semiconductor material and the recycle process of gallium, indium as an example.

The method for recovering the metals according to the present invention will be explained in details.

The present invention is characterized by recovering gallium, indium and aluminum with the use of the adsorbent containing the rare-earth metal compound to an object to be treated such as the III-V group compound semiconductors containing at least one element selected from the group comprising arsenic, antimony and selenium to separate the harmful element from them. The "The III-V group compound semiconductors or the semiconductor materials of them containing at least one element selected from the group comprising arsenic, antimony and selenium" is not particularly limited, as long as it contains the arsenic, antimony and selenium.

This is because the present invention is able to provide a method for recovering rare metals with arsenic etc., being treated safely.

Moreover, in the preferable embodiment of the method for recovering the metals according to the present invention, the method contains the step of adsorbing selectively arsenic, antimony and selenium existing in the harmful compound generated in the step of recovering at least one metal selected from the group comprising gallium, indium and aluminum, with the use of the adsorbent. At this moment, a method or a step for recovering at least one metal selected from the group comprising gallium, indium and aluminum is not particularly limited, however, for example, mention may be made of at least one method selected from the group comprising an oxidation combustion method, a vacuum thermal recycling method, a separation and refinement method using an ion-exchange resin and a neutralization precipitation method.

For example, in the oxidation combustion method, an complex oxide made of gallium and arsenic, such as $GaAsO_4$ can generate, however, it is possible to recover the metals safely even if such complex oxide generates because the present invention makes it possible to remove the harmful substance such as arsenic selectively.

The III-V group compound semiconductors or semiconductor materials of them which are an object to be treated in the present invention, are not particularly limited, as long as it contains at least one element selected from the group comprising arsenic, antimony and selenium, but for example, mention may be made of at least one derived from those selected from the group comprising crystal scrap, wafer scrap, powdery waste metal, grinding waste liquid, sludge, scrap, etching waste liquid which are generated in the manufacture or process of the semiconductor or the semiconductor material. Among them, the method of the present invention has especially a beneficial effect on the separation of arsenic and gallium, and the separation of arsenic, gallium and indium.

The adsorbent used in the present invention contains the rare-earth metal compound. The rare-earth metal compound is not particularly limited, as long as it is possible to separate the harmful compound such as arsenic, antimony and selenium from other rare metals, however, it is preferably at least one oxide, hydrate or hydroxide selected from the group comprising cerium, samarium, neodymium, gadolinium, lanthanum and yttrium.

Among them, cerium oxide hydrate ($CeO_2 \cdot 1.6H_2O$), samarium oxide hydrate ($Sm_2O_3 \cdot 4.1H_2O$), neodymium oxide hydrate ($Nd_2O_3 \cdot 4.7H_2O$), gadolinium oxide hydrate ($Gd_2O_3 \cdot 5.0H_2O$), lanthanum oxide hydrate ($La_2O_3 \cdot 3.0H_2O$), yttrium oxide hydrate ($Y_2O_3 \cdot 2.1H_2O$), cerium hydroxide ($Ce(OH)_3$ or $Ce(OH)_4$) are preferable because it can be used in the form of oxide, hydrate or hydroxide, and in the form of fine particle. Furthermore, from a viewpoint of the reduction of the processing time, cerium compound having a large coupling constant with the inorganic arsenic is preferable, in particular, hydrous oxide of cerium, or oxide, hydrate or hydroxide of cerium are preferable.

Moreover, adsorbent may be mixed with the water-absorbing substances. The water-absorbing substances are not particularly limited, but it is possible to use such as the diatom earth which the main component is silicon oxide ($SiO_2$), activated charcoal, shirasuballoon, peat and pumice, it is preferable to use them in the form of fine particle. Among these water-absorbing substances, the diatom earth is particularly preferable which has an outstanding water-absorbing property and water permeability, and has a relatively modest cost.

It is unclear why arsenic, antimony and selenium can be adsorbed to the rare-earth metal including cesium hydroxide (hydrated cerium oxide), however, it may be estimated that it can bind through metal and hydroxyl group with the surface of the rare-earth metal compound such as cerium compound. The present inventors find the method for recovering the metals according to the present invention through the use of the specific bonding manner.

In the present invention, since the rare-earth metal compound is used as the adsorbent, it has an advantageous effect that not only it is possible to treat the object at low cost in large amounts, but also it is easy to recover the adsorbed arsenic, antimony and selenium. For example, the mix of the adsorbent adsorbing arsenic etc., into the treatment solvent containing hydrogen peroxide adjusted at about pH7-11 makes it possible to eliminate arsenic etc., into the treatment solvent.

It is possible to convert the recovered arsenic etc., in this way into substances having a lower toxicity by means of the step of synthesizing the organic metal compound by the methylation of arsenic. etc. Furthermore, it is also possible to recycle the adsorbent after the arsenic etc., are eliminated from the adsorbent. It is desired that not only a degree of purity is high, but also a harmful compound is eliminated and further treated in the case that the waste materials of the semiconducting material are recycled to recover the rare metals. In the present invention, the method also makes it possible to treat the harmful compound such as arsenic etc., which are not treated in the prior art.

It is possible to methylate arsenic etc., using methylcobalamin, acetic acid, methyl halide, alkylaluminium, Grignard reagent, extractive enzyme etc., as mentioned later in Example 2, in the step of detoxifying the adsorbed and recovered arsenic, antimony and selenium by converting these elements into the organic metal compound by the methylation of the adsorbed and recovered arsenic, antimony and selenium. The toxicity of arsenic is considerably reduced in the form of the organic arsenic compound such as a form which the methyl group(s) binds to arsenic. It is also the same in the case of selenium and antimony which are similar to arsenic. In particular, it is well known that the toxicity of arsenobetaine is low which is trimethylated.

FIG. 1 shows a scheme concerning the recovery of metals from various sorts of the object to be treated.

FIGS. 1-(1) and (2) show that gallium and indium are recovered through the steps of selectively adsorbing and separating them using the adsorbent after the treatment of the oxidation combustion method as mentioned above, while the adsorbed arsenic is converted into the organic metal compound at the step of detoxifying the arsenic.

As shown in FIGS. 1-(3) and (4), it can contain the steps of the acid dissolution and neutralization. The steps of the acid dissolution is so-called wet process, which is a method for solving the crystal scraps etc., with the acid such as sulfuric acid to precipitate indium oxide by the pH adjustment of the dissolved solution. Further, according to the objects to be treated, it may contain the step of removing a package (a resin) as shown in FIG. 1-(7). Moreover, as shown in FIGS. 1-(5) and (6), the steps of selectively adsorbing and separating them may have also applicability to the etching waste solution or the grinding waste solution.

In the present invention, a specific method or form of the adsorption is also not particularly limited. An object to be treated containing the harmful compound such as arsenic may just be contacted with the above mentioned adsorbent. When the adsorbent is contacted with an object to be treated, agitating and/or heating and/or diluting of the solvent is preferable from the viewpoint that these have an effect that not only the reaction system is uniformized, but also these makes it possible to easily come about the adsorption reaction by making bare the inorganic compound existing in the object to be treated. In this case, the adsorbent is preferably dispersed into the mixed solution of the solvent such as water or oil and the object, or a solution containing the object to be treated is preferably passed through the adsorption tower filled up with the adsorbent.

In addition, a method of contacting them in the batch type of the absorption bath with agitating the object to be treated can be used, or the adsorbent and the object can be also contacted with each other in the fixed bed or fluid bed. Moreover, it may be also contacted by filling up or mounting them to the conventional known adsorption equipment such as the rotary type of the adsorption tower or the stationary type of the adsorption tower. Alternatively, the adsorbent may be put into the porous material such as a net and they may be added directly and contacted into a vessel such as the pole trance.

The contact time and the contact temperature of the adsorbent and the object to be treated are not particularly limited, it may make contact under the conditions of the agitation or the heating. Although the contact time can be selected depending on initial concentration of the metal compound existing in the object to be treated, type of the solvent (oil or water), contact temperature, type or amount of the adsorbent, form of the adsorbent, it is industrially preferable within a week, more preferably within a day. If the contact time is too short, it does not become good enough to adsorb, and if the contact time is too long, it is believed to be meaningless because an amount of the adsorb is saturated. The contact time is not particularly limited, as long as it is possible to treat them as a liquid. The room temperature is desirable from the view point of the handleability of the work. The solution containing the object to be treated may be heated if needed. The heating means is not particularly limited, but mention may be made of the heating from the outside source such as a heater, the heating from the inside source such as an immersion type of heater, the heating with the use of microwave or ultrasonic wave etc. Moreover, concerning the pH range, arsenic is intended to be easily adsorbed with the adsorbent if the pH range is 1 to 10, preferably 3 to 9.

Moreover, an agitation condition is not particularly limited in the case of the contact under the agitation, as long as a method make it possible to directly or indirectly render a convection to a solution containing the object to be treated. For example, mention may be made of (1) a method of stirring the solution using the stirring device such as agitation blade, magnetic stirrer etc., (2) a method of vibrating the vessel (for example, pole trance member) filled up with the solution containing the object to be treated by means of the use of vibration type of stirrer, vibrating table, shaker etc. (For example, a method of vibrating it in a direction parallel to vertical and/or horizontal directions, a method of rotatory vibrating it), (3) a method of rendering the vibration to the solution filled up in the vessel with the use of ultrasonic wave or magnet.

As mentioned above, in the present invention, a method for contacting the adsorbent and the object to be treated is not particularly limited. It is also possible to separate it by application of the known separating method according to the chromatography to the adsorbent used in the present invention. Moreover, the above adsorbent not only can be used by itself, but also can be used in combination with an adsorbent other than the rare-earth metal compound.

EXAMPLE

The following Examples will explain a selective adsorption performance of the adsorbent made of rare-earth metal and a detoxification reaction of arsenic, but the invention is not intended to be interpreted as being limited to Examples.

Example 1

Into a 1.5 mL by volume of Eppendorf tube were added 1 mL of ultrapure water, solutions containing gallium, arsenic and indium having the predetermined concentration as shown in the Table 1 (a standard solution for atomic absorption, 1000 mg/L), and 100 mg of an adsorbent ground in a mortar (Nippon Sheet Glass Company, Limited, ADCERA, which is calcined and granulated by mixing a diatom earth and a rare-earth metal compound.). This was stirred in constant-temperature bath maintained at 30° C., with sampling each 30 µL of those after 1 hour, 14 hours, 24 hours and 95 hours, respectively to dilute with the ultrapure water to obtain a total amount of 3 mL, and then a concentration of the metal was analyzed by an ICP-MS method. A variation per hour of the concentration of a metal ion in the adsorption test is shown in the Tables 2 and 3, and FIG. 2.

TABLE 1

| | Initial (0 hr) concentration (ppm) | | | Initial additive amount | |
|---|---|---|---|---|---|
| No. | Ga | As | In | Ultrapure water µL | adsorbent mg |
| 1 | 100 | 0 | 0 | 1000 | 100 |
| 2 | 0 | 100 | 0 | 1000 | 100 |
| 3 | 0 | 0 | 100 | 1000 | 100 |
| 4 | 100 | 100 | 0 | 1000 | 100 |
| 5 | 100 | 100 | 100 | 1000 | 100 |

TABLE 2

| | adsorption test (time) (1 hr) concentration (ppm) | | | adsorption test (time) (14 hr) concentration (ppm) | | |
|---|---|---|---|---|---|---|
| No. | Ga | As | In | Ga | As | In |
| 1 | 90 | 0 | 0 | 37 | 0 | 0 |
| 2 | 0 | 17 | 0 | 0 | 1 | 0 |
| 3 | 0 | 0 | 43 | 0 | 0 | 18 |
| 4 | 80 | 47 | 0 | 77 | 11 | 0 |
| 5 | 83 | 57 | 100 | 87 | 24 | 107 |

TABLE 3

| | adsorption test (time) (24 hr) concentration (ppm) | | | adsorption test (time) (95 hr) concentration (ppm) | | |
|---|---|---|---|---|---|---|
| No. | Ga | As | In | Ga | As | In |
| 1 | 22 | 0 | 0 | 5 | 0 | 0 |
| 2 | 0 | 3 | 0 | 0 | 1 | 0 |
| 3 | 0 | 0 | 12 | 0 | 0 | 7 |
| 4 | 67 | 13 | 0 | 33 | 2 | 0 |
| 5 | 83 | 18 | 93 | 70 | 4 | 90 |

Figure 2:
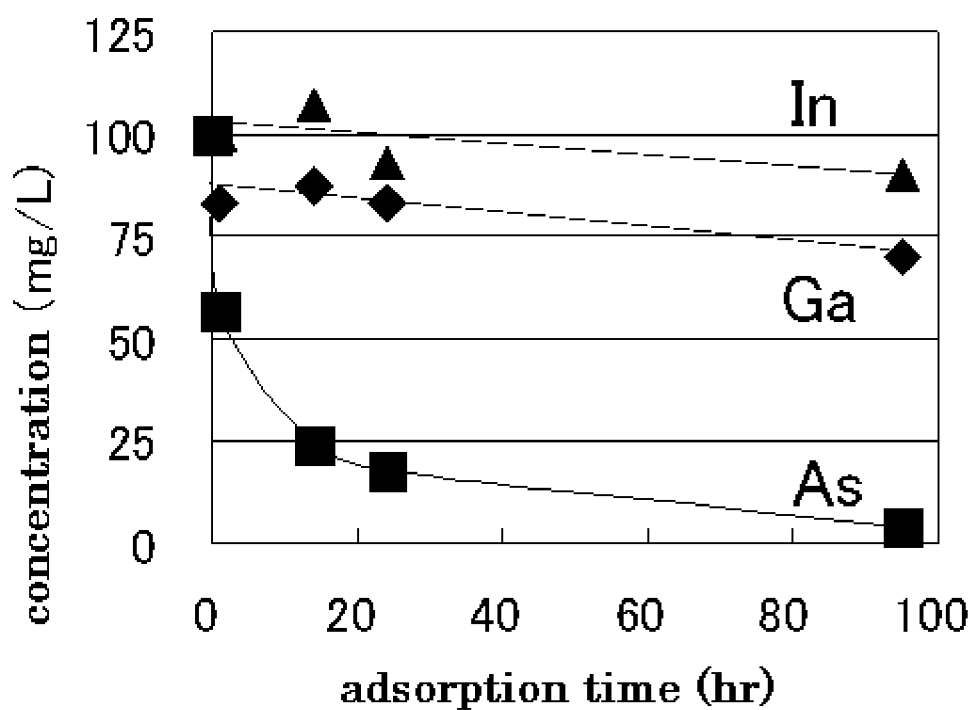
FIG. 2 shows a result of the adsorption test of the mixed aqueous solution made of gallium, indium and arsenic.

From a result of Tables 2 and 3 and FIG. 2, it is revealed that only arsenic is selectively adsorbed from the solution containing indium, gallium and arsenic. Owing to the adsorbent containing the rare-earth metal compound, it is revealed that it is possible to selectively adsorb and separate arsenic only from the solution containing gallium, indium and arsenic.

Example 2

Next, the synthesis (detoxification) of an organic metal compound by methylating arsenic with the use of methylcobalamin will be explained. The conformation of methylcobalamin, and a reactive process of detoxifying arsenic are shown in the [Chemical 1].

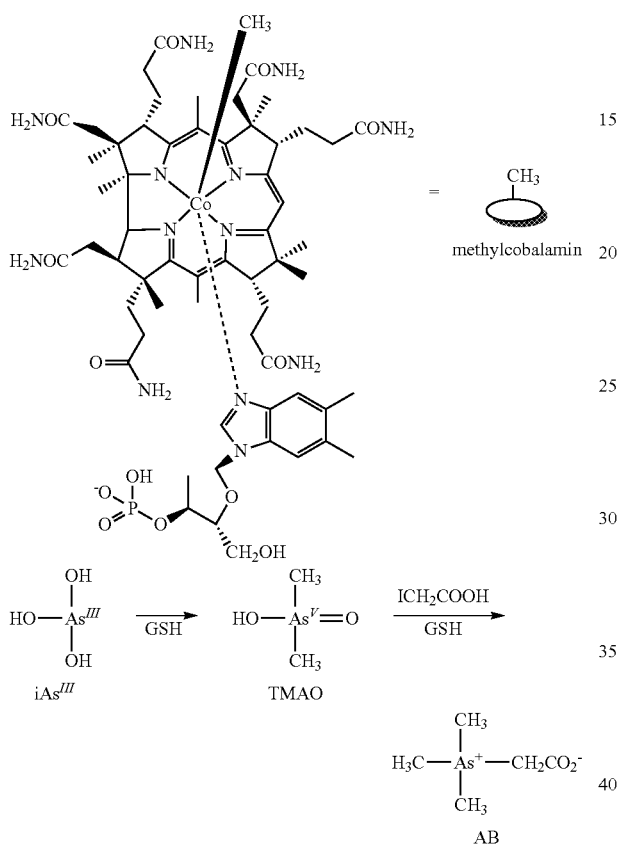

[Chemical 1]

Into a 0.2 mL of Eppendorf tube 60 mg of a reduced glutathione (GSH) (0.195 mmol.), 10 mg of methylcobalamin (7.44 μmoL), Tris-HCL buffer solution (pH8, 50 μL) were added. To this, 2 μL of arsenic standard solution (for an atomic absorption, 100 ppm as arsenic) was added, and then it was set on an aluminum block heater heated at 125° C. to be reacted for a predetermined time. The reaction production was diluted 10 folds with 10% of the hydrogen peroxide solution, and analyzed by HPLC-ICP-MS method. The arsenic compounds in the reaction mixture was 99.2% of trimethyl arsine oxide (TMAO), 0.8% of tetramethyl arsonium (TeMA).

Further, trimethyl arsine oxide (TMAO) (0.267 μM) and a reduced glutathione (GSH) (5 mM) were reacted in 100 mM of phosphoric acid-citric acid buffer solution (pH5) for 37° C. for 100 hours, and then the production amount of TMAO and arsenobetaine (AB) were assayed by HPLC-ICP-MS. A relative ratio of the arsenic compound in the reaction mixture was 0.5% for TMAO, 99.5% for AB, respectively.

INDUSTRIAL APPLICABILITY

The present inventions make it possible to selectively adsorb the harmful compounds such as arsenic etc., which are contained in the semiconductor and semiconducting material etc., and recover the metals more safely. The methods make a significant contribution in the broad fields of the recycle treatment relating to the semiconductor.

The invention claimed is:
1. A method comprising:
recovering at least one metal selected from the group consisting of gallium, indium and aluminum from III-V group compound semiconductors, or semiconducting materials thereof, that contain at least one element selected from the group consisting of arsenic, antimony and selenium;
adsorbing the at least one element selected from the group consisting of arsenic, antimony and selenium selectively on an adsorbent comprising (1) a rare-earth metal compound and (2) a water-absorbing substance selected from the group consisting of diatomaceous earth, silicon oxide, activated charcoal, shirasuballoon, peat and pumice; and
detoxifying the at least one element selected from the group consisting of arsenic, antimony and selenium adsorbed on the adsorbent by methylating the at least one element selected from the group consisting of arsenic, antimony and selenium.

2. A method according to claim 1, wherein the at least one element selected from the group consisting of arsenic, antimony and selenium in the step of adsorbing the at least one element selected from the group consisting of arsenic, antimony and selenium is generated in the step of recovering the at least one metal selected from the group consisting of gallium, indium and aluminum.

3. A method according to claim 1, wherein the recovering the at least one metal selected from the group consisting of gallium, indium and aluminum includes at least one selected from the group consisting of an oxidation combustion method, a vacuum thermal recycling method, a separation and refinement method using an ion-exchange resin and a neutralization precipitation method.

4. A method according to claim 1, wherein the III-V group compound semiconductors or the semiconducting materials thereof containing the at least one element selected from the group consisting of the arsenic, antimony and selenium are originated from at least one selected from the group consisting of crystal scrap, wafer scrap, powdery waste metal, grinding waste liquid, sludge, scrap, and etching waste liquid, which is generated during manufacture or processing of the semiconductors or the semiconducting materials.

5. A method according to claim 1, wherein the rare-earth metal compound is at least one selected from the group consisting of an oxide of cerium, a hydrate of cerium, a hydroxide of cerium, an oxide of samarium, a hydrate of samarium, a hydroxide of samarium, an oxide of neodymium, a hydrate of neodymium, a hydroxide of neodymium, an oxide of gadolinium, a hydrate of gadolinium, a hydroxide of gadolinium, an oxide of lanthanum, a hydrate of lanthanum, a hydroxide of lanthanum, an oxide of yttrium, a hydrate of yttrium and a hydroxide of yttrium.

* * * * *